United States Patent
Sjödin et al.

(10) Patent No.: US 10,180,292 B2
(45) Date of Patent: Jan. 15, 2019

(54) PLATE HEAT EXCHANGER

(71) Applicant: ALFA LAVAL CORPORATE AB, Lund (SE)

(72) Inventors: Per Sjödin, Lund (SE); Kristian Walter, Genarp (SE)

(73) Assignee: ALFA LAVAL CORPORATE AB, Lund (SE)

( * ) Notice: Subject to any disclaimer, the term of this patent is extended or adjusted under 35 U.S.C. 154(b) by 238 days.

(21) Appl. No.: 14/910,773

(22) PCT Filed: Sep. 10, 2014

(86) PCT No.: PCT/EP2014/069239
§ 371 (c)(1),
(2) Date: Feb. 8, 2016

(87) PCT Pub. No.: WO2015/043944
PCT Pub. Date: Apr. 2, 2015

(65) Prior Publication Data
US 2016/0202005 A1     Jul. 14, 2016

(30) Foreign Application Priority Data

Sep. 26, 2013  (EP) .................................... 13186257
Sep. 27, 2013  (EP) .................................... 13186388

(51) Int. Cl.
*B23K 1/00*     (2006.01)
*F28F 21/08*    (2006.01)
(Continued)

(52) U.S. Cl.
CPC ............ *F28F 21/081* (2013.01); *B23K 1/008* (2013.01); *B23K 1/0012* (2013.01); *B23K 1/19* (2013.01);
(Continued)

(58) Field of Classification Search
CPC ...... F28F 21/081; F28F 21/082; F28F 21/087; F28F 2275/045; B23K 35/3601; Y10T 29/49368; Y10T 29/49369
(Continued)

(56) References Cited

U.S. PATENT DOCUMENTS 2,289,365 A     7/1942  Jerabek
4,135,656 A     1/1979  Stern
(Continued)

FOREIGN PATENT DOCUMENTS

CN     2566214 Y     8/2003
CN     1478008 A     2/2004
(Continued)

OTHER PUBLICATIONS

English translation of the Taiwanese Office Action and Search Report, dated Jun. 23, 2016, for Taiwanese Application No. 103126724.
(Continued)

*Primary Examiner* — Orlando E. Aviles
*Assistant Examiner* — Paul Schwarzenberg
(74) *Attorney, Agent, or Firm* — Birch, Stewart, Kolasch & Birch, LLP

(57) ABSTRACT

The invention relates to a method for producing a permanently joined plate heat exchanger comprising a plurality of metal heat exchanger plates having a solidus temperature above 1000° C., provided beside each other and forming a plate package with first plate interspaces for a first medium and second plate interspaces for a second medium, wherein the first and second plate interspaces are provided in an alternating order in the plate package, wherein each heat exchanger plate comprises a heat transfer area and an edge area comprising bent edges which extend around the heat transfer area, wherein a first surface of the plates forms a convex shape and a second surface of the plates forms a
(Continued)

concave shape, wherein the heat transfer area comprises a corrugation of elevations and depressions, wherein said corrugation of the plates and the bent edges are provided by pressing the plates. The invention also relates to a plate heat exchanger produced by the method.

21 Claims, 7 Drawing Sheets

(51) Int. Cl.

| | | |
|---|---|---|
| B23K 1/20 | (2006.01) | |
| B23K 35/36 | (2006.01) | |
| C22C 9/00 | (2006.01) | |
| C22C 19/03 | (2006.01) | |
| C22C 19/05 | (2006.01) | |
| C22C 19/07 | (2006.01) | |
| C22C 38/00 | (2006.01) | |
| C22C 38/18 | (2006.01) | |
| C22C 38/40 | (2006.01) | |
| C22C 38/44 | (2006.01) | |
| C22C 38/58 | (2006.01) | |
| F28D 9/00 | (2006.01) | |
| B23K 1/008 | (2006.01) | |
| B23K 1/19 | (2006.01) | |
| B23K 35/365 | (2006.01) | |
| B23K 20/02 | (2006.01) | |
| B23K 20/16 | (2006.01) | |
| B23K 35/00 | (2006.01) | |
| B23K 35/30 | (2006.01) | |
| B23K 35/02 | (2006.01) | |
| B23K 101/14 | (2006.01) | |
| F28F 3/02 | (2006.01) | |

(52) U.S. Cl.
CPC ............... *B23K 1/20* (2013.01); *B23K 1/203* (2013.01); *B23K 20/023* (2013.01); *B23K 20/16* (2013.01); *B23K 35/001* (2013.01); *B23K 35/004* (2013.01); *B23K 35/025* (2013.01); *B23K 35/0222* (2013.01); *B23K 35/3033* (2013.01); *B23K 35/3053* (2013.01); *B23K 35/3601* (2013.01); *B23K 35/365* (2013.01); *B23K 35/3612* (2013.01); *C22C 9/00* (2013.01); *C22C 19/03* (2013.01); *C22C 19/056* (2013.01); *C22C 19/058* (2013.01); *C22C 19/07* (2013.01); *C22C 38/00* (2013.01); *C22C 38/18* (2013.01); *C22C 38/40* (2013.01); *C22C 38/44* (2013.01); *C22C 38/58* (2013.01); *F28D 9/0037* (2013.01); *F28F 21/082* (2013.01); *F28F 21/087* (2013.01); *B23K 2101/14* (2018.08); *B23K 2201/14* (2013.01); *F28F 3/025* (2013.01); *F28F 2275/045* (2013.01)

(58) Field of Classification Search
USPC ........................................................ 165/11.2
See application file for complete search history.

(56) References Cited

U.S. PATENT DOCUMENTS

| | | | |
|---|---|---|---|
| 4,143,258 A | 3/1979 | McCann et al. | |
| 4,313,661 A | 2/1982 | Yamamichi | |
| 5,267,390 A * | 12/1993 | Yang .................. | C23C 16/0272 205/188 |
| 6,264,761 B1 | 7/2001 | Hasegawa et al. | |
| 6,394,179 B1 * | 5/2002 | Blomgren .............. | F28D 9/005 165/167 |
| 8,857,699 B2 | 10/2014 | Sjodin et al. | |
| 2004/0056074 A1 * | 3/2004 | Sjodin .................. | B23K 35/308 228/183 |
| 2004/0072013 A1 | 4/2004 | Tada | |
| 2004/0129412 A1 * | 7/2004 | Wagner ................ | B23K 1/0012 165/166 |
| 2004/0184945 A1 * | 9/2004 | Sjodin ................ | B23K 35/3086 420/42 |
| 2006/0060296 A1 | 3/2006 | Sigler et al. | |
| 2006/0102696 A1 * | 5/2006 | Graham ............... | B23K 35/002 228/101 |
| 2007/0164088 A1 | 7/2007 | Dianatkhah | |
| 2008/0006676 A1 | 1/2008 | Rangaswamy et al. | |
| 2008/0127494 A1 | 6/2008 | Rassmus et al. | |
| 2009/0016953 A1 * | 1/2009 | Weil .................... | B23K 35/0244 423/593.1 |
| 2009/0202858 A1 * | 8/2009 | Herber ................. | B23K 20/023 428/637 |
| 2009/0305078 A1 * | 12/2009 | Sjodin ................ | B23K 35/3053 428/656 |
| 2012/0183807 A1 | 7/2012 | Persson | |
| 2013/0084467 A1 | 4/2013 | Sjödin | |
| 2015/0097023 A1 | 4/2015 | Clement | |

FOREIGN PATENT DOCUMENTS

| | | |
|---|---|---|
| CN | 1514758 A | 7/2004 |
| CN | 101100023 A | 1/2008 |
| CN | 101184578 A | 5/2008 |
| CN | 201322570 Y | 10/2009 |
| CN | 102308177 A | 1/2012 |
| CN | 101588890 B | 3/2012 |
| CN | 1474732 B | 4/2012 |
| CN | 102574249 A | 7/2012 |
| EP | 0 508 439 A2 | 10/1992 |
| EP | 0 668 806 B1 | 8/1998 |
| EP | 2 644 312 A1 | 10/2013 |
| FR | 2987570 A1 | 9/2013 |
| GB | 1 256 147 | 12/1971 |
| JP | 8-271175 A | 10/1996 |
| JP | 10-29075 A | 2/1998 |
| JP | 11-287576 A | 10/1999 |
| JP | 2002-539407 A | 11/2002 |
| JP | 2003-48076 A | 2/2003 |
| JP | 2004-529775 A | 9/2004 |
| JP | 2005-940 A | 1/2005 |
| JP | 2005-88062 A | 4/2005 |
| JP | 2010-510067 A | 4/2010 |
| KR | 10-2008-0015871 A | 2/2008 |
| KR | 10-2009-0084942 A | 8/2009 |
| RU | 2 096 150 C1 | 11/1997 |
| RU | 2 167 751 C2 | 5/2001 |
| SE | 416 898 B | 2/1981 |
| SU | 659326 A | 4/1979 |
| TW | M298107 U | 9/2006 |
| WO | WO 96/37335 A1 | 11/1996 |
| WO | WO 97/43082 A1 | 11/1997 |
| WO | WO 00/00310 A1 | 1/2000 |
| WO | WO 02/090032 A1 | 11/2002 |
| WO | WO 2006/126953 A1 | 11/2006 |
| WO | WO 2008/060225 A1 | 5/2008 |
| WO | WO 2010/090557 A1 | 8/2010 |
| WO | WO 2012/081346 A1 | 6/2012 |
| WO | WO 2013/144211 A1 | 10/2013 |
| WO | WO 2013/144251 A1 | 10/2013 |
| WO | WO 2014/022625 A1 | 2/2014 |

OTHER PUBLICATIONS

English translation of a Korean Office Action issued in Korean Application No. 10-2016-7010473 dated Aug. 25, 2017.
European Office Action, dated Jul. 12, 2016, for corresponding European Application No. 13 186 388.8.
Chinese Office Action and Search Report, dated Sep. 1, 2017, for Chinese Application No. 201480052749.9.
English translations of the Chinese Office Action and Search Report, dated Jul. 31, 2017, for Chinese Application No. 201480052776.6.

(56) References Cited

OTHER PUBLICATIONS

English translation of the Chinese Office Action and Search Report issued in Chinese Application No. 201480052777.0 dated May 15, 2017.
English translation of Korean Office Action for Appl. No. 10-2016-7010585 dated Apr. 24, 2017.
English translation of the Japanese Office Action, dated Mar. 27, 2017, for Japanese Application No. 2016-517375.
International Search Report, issued in PCT/EP2014/069239, dated Dec. 19, 2014.
Rassmus et al., "Joining aspects on large plate heat exchangers in stainless steel", Proceedings of the 3rd International Brazing and Soldering Conference, Apr. 24-26, 2006, Crowne Plaza Riverwalk Hotel, San Antonio, Texas, USA, XP003028289, pp. 357-362.
Written Opinion of the International Searching Authority, issued in PCT/EP2014/069239, dated Dec. 19, 2014.
English translation of Korean Office Action for Appl. No. 10-2016-7010460 dated Jan. 4, 2018.
English translations of the Russian Office Action and Search Report, dated Jun. 1, 2017, for Russian Application No. 2016106302.
European Office Action dated Aug. 13, 2018 for Application No. 13 186 257.5.

\* cited by examiner

Width (mm)

PLATE HEAT EXCHANGER

BACKGROUND

The invention relates to a method for producing a plate heat exchanger and to a plate heat exchanger produced by the method.

TECHNICAL FIELD

Different methods may be used for joining alloys having high melting temperatures. In this context "high melting temperature" is a melting temperature above 900° C. Welding is a common method wherein the parent metal is melted with or without additional material, ie a cast product is created by melting and re-solidification.

Brazing is a process for joining solid metals in close proximity by introducing a liquid metal that melts above 450° C. A brazed joint generally results when an appropriate filler alloy is selected, the parent metal surfaces are clean and remain clean during heating to the flow temperature of the brazing alloy, and a suitable joint design is used. During the process the braze filler is melted at a temperature above 450° C., ie a liquid interface is formed at a temperature lower than the liquidus temperature of the parent metal to be joined. In order to achieve brazing the liquid interface should have good wetting and flow.

Soldering is a process in which two or more metal items are joined by melting and flowing of a filler metal, i.e. a solder, into the joint, the solder having a lower melting point than the work-piece. In brazing, the filler metal melts at a higher temperature than the solder, but the work-piece metal does not melt. The distinction between soldering and brazing is based on the melting temperature of the filler alloy. A temperature of 450° C. is usually used as a practical delineating point between soldering and brazing.

In general, the procedure of brazing involves application of a braze filler in contact with the gap or the clearance between the parent metal to be joined. During the heating process the braze filler melts and fills the gap to be joined. In the brazing process there are three major stages, wherein the first stage is called the physical stage. The physical stage includes wetting and flowing of the braze filler. The second stage normally occurs at a given joining temperature. During this stage there is solid-liquid interaction, which is accompanied by substantial mass transfer. The parent metal volume that immediately adjoins the liquid filler metal either dissolves or is reacted with the filler metal in this stage. At the same time a small amount of elements from the liquid phases penetrates into the solid parent metal. This redistribution of components in the joint area results in changes to the filler metal composition, and sometimes, the onset of solidification of the filler metal. The last stage, which overlaps the second, is characterized by the formation of the final joint microstructure and progresses during solidification and cooling of the joint.

Another method for joining two metal parts (parent materials) is transient liquid phase diffusion bonding (TLP bonding) where diffusion occurs when a melting point depressant element from an interlayer moves into lattice and grain boundaries of the metal parts at the bonding temperature. Solid state diffusional processes then lead to a change of composition at the bond interface and the dissimilar interlayer melts at a lower temperature than the parent materials. Thus a thin layer of liquid spreads along the interface to form a joint at a lower temperature than the melting point of either of the metal parts. A reduction in bonding temperature leads to solidification of the melt, and this phase can subsequently be diffused away into the metal parts by holding at bonding temperature for a period of time.

Joining methods such as welding, brazing and TLP-bonding successfully joins metal parts. However, welding has its limitations as it may be very expensive or even impossible create a large number of joints when they are hard to access. Brazing has also its limitations, for example in that it may be difficult to properly apply or even determine a most suitable filler metal. TLP-bonding as advantageous when it comes to joining different material but has its limitations. For example, it is often hard to find a suitable interlayer and the method is not really suitable for creating a joint where a large gaps is to be filled or when a relatively large joint is to be formed.

Thus, many factors are involved when selecting a certain joining method. Factors that also are crucial are cost, productivity, safety, process speed and properties of the joint that joins the metal parts as well as properties of the metal parts per se after the joining. Even though the aforementioned methods have their advantages, there is still a need for a joining method to be used as a complement to the present methods, in particular if factors like cost, productivity, safety and process speed are taken into account.

SUMMARY

The object of the invention is to improve the above techniques and the prior art. In particular, it is an object to provide a method to produce a permanently joined plate heat exchanger in a simple and reliable manner while still producing a strong joint between the plates of the plate heat exchanger.

To solve these objects a method for producing a permanently joined plate heat exchanger comprising a plurality of metal heat exchanger plates having a solidus temperature above 1000° C. is provided. The plates are provided beside each other and forming a plate package with first plate interspaces for a first medium and second plate interspaces for a second medium, wherein the first and second plate interspaces are provided in an alternating order in the plate package. Each heat exchanger plate comprises a heat transfer area and an edge area comprising bent edges which extend around the heat transfer area. A first surface of the plates forms a convex shape and a second surface of the plates forms a concave shape and the heat transfer area comprises a corrugation of elevations and depressions. Said corrugation of the plates and the bent edges are provided by pressing the plates. The method comprises the steps of:

applying a melting depressant composition on at least a part of the first convex surface of a first plate, the melting depressant composition comprising a melting depressant component that comprises at least 25 wt % phosphorus and silicon for decreasing a melting temperature of the first plate, and optionally, a binder component for facilitating the applying of the melting depressant composition on the first surface, bringing a second concave surface of a second plate into contact with the melting depressant composition on said first convex surface of the first plate by stacking the plates into a plate package, heating the first and second plates to a temperature above 1000° C., said first convex surface of the first plate thereby melting such that a surface layer of the first plate melts and, together with the melting depressant component, forms a molten metal layer that is in contact with the second plate at contact points between the first plate and the second plate, and allowing the molten metal layer to solidify, such that a joint is obtained at the contact points between the plates in the plate package and such that the bent edges form a tight fit between the bent edges of the plates in the plate package.

The metal of the plates may have the form of e.g. iron-, nickel and cobalt-based metallic alloys, as they typically have a solidus temperature above 1000° C. The plates may not be pure aluminum or aluminum-based alloys that do not have a solidus temperature above 1000° C. The metal in the metal plates or even the metal plate per se may be referred to as the "parent metal" or "parent material". In this context, an "iron-based" alloy is an alloy where iron has the largest weight percentage of all elements in the alloy (wt %). The corresponding situation also applies for nickel-, cobalt-, chromium- and aluminum-based alloys.

As indicated, the melting depressant composition comprises at least one component, which is the melting depressant component. Optionally, the melting depressant composition comprises a binder component. All substances or parts of the melting depressant composition that contributes to decreasing a melting temperature of at least the first plate is considered to be part of the melting depressant component. Parts of the melting depressant composition that are not involved in decreasing a melting temperature of at least the first plate but instead "binds" the melting depressant composition, such that it forms e.g. a paste, paint or slurry, is considered to be part of the binder component. Of course, the melting depressant component may include other components, such as small amounts of filler metal. However, such filler metal may not represent more than 75 wt % of the melting depressant component, since at least 25 wt % of the melting depressant component comprises phosphorus and silicon. If a filler metal is included in the melting depressant composition, it is always part of the melting depressant component.

In this context, "phosphorus and silicon" means the sum of phosphorus and silicon in the melting depressant component, as calculated in wt %. Here, wt % means weight percentage which is determined by multiplying mass fraction by 100. As is known, mass fraction of a substance in a component is the ratio of the mass concentration of that substance (density of that substance in the component) to the density of the component. Thus, for example, at least 25 wt % phosphorus and silicon means that the total weight of phosphorus and silicon is at least 25 g. in a sample of 100 g melting depressant component. Obviously, if a binder component is comprised in the melting depressant composition, then the wt % of phosphorus and silicon in the melting depressant composition may be less than 25 wt %. However, at least 25 wt % phosphorus and silicon are always present in the melting depressant component, which, as indicated, also includes any filler metal that may be included, i.e. filler metal is always seen as part of the melting depressant composition.

The "phosphorus" includes all phosphorus in the melting depressant component, which includes elemental phosphorus as well as phosphorus in a phosphorus compound. Correspondingly, the "silicon" includes all silicon in the melting depressant component, which includes elemental silicon as well as silicon in a silicon compound. Thus, both the phosphorus and silicon may, in the melting depressant component, be represented by the phosphorus and silicon in various phosphorus and silicon compounds.

Obviously, the melting depressant composition is very different from conventional brazing substances since they have much more filling metal relative melting depressing substances like phosphorus and silicon. Generally, brazing substances have less than 18 wt % phosphorus and silicon.

The method is advantageous in that filler metal may be reduced or even excluded and in that it may be applied for metal plates that are made of different materials. Of course, the melting depressant composition may be applied on the second metal plate as well.

The phosphorus may originate from any of elemental phosphorus and phosphorus of a phosphorus compound selected from at least any of the following compounds: manganese phosphide, iron phosphide and nickel phosphide. The silicon may originate from any of elemental silicon and silicon of a silicon compound selected from at least any of the following compounds: silicon carbide, silicon boride and ferrosilicon.

The melting depressant component may comprise any of at least 25 wt %, at least 35 wt % and at least 55 wt % phosphorus and silicon. This means that if any filler metal is present it is present in amounts of less than 75 wt %, less than 65 wt % respectively less than 45 wt %.

Phosphorus may constitute at least 10 wt % of the phosphorus and silicon content of the melting depressant compound. This means that, when the melting depressant component comprise at least 25 wt % phosphorus and silicon, then the melting depressant component comprises at least at least 2.5 wt % phosphorus. Silicon may constitute at least 55 wt % of the phosphorus and silicon content of the melting depressant compound.

The melting depressant component may comprise less than 50 wt % metallic elements, or less than 10 wt % metallic elements. Such metallic elements corresponds to the "metal filler" discussed above. Such small amounts of metallic elements or metal filler differentiates the melting depressant composition starkly from e.g. known brazing compositions since they comprise at least 60 wt % metallic elements. Here, "metallic elements" include e.g. all transition metals, which are the elements in the d-block of the periodic table, which includes groups 3 to 12 on the periodic table. This means that, for example, iron (Fe), nickel (Ni), cobalt (Co), chromium (Cr) and molybdenum (Mo) are "metallic elements. Elements that are not "metallic elements" are the noble gases, the halogens and the following elements: boron (B), carbon (C), silicon (Si), nitrogen (N), phosphorus (P), arsenic (As), oxygen (O), sulfur (S), selenium (Se) and tellurium (Tu). It should be noted that, for example, if the phosphorus comes from the compound manganese phosphide, then the manganese-part of this compound is a metallic element that is included in the metallic elements that in one embodiment should be less than 50 wt % and in the other embodiment less than 10 wt %.

The plates may comprise a thickness of 0.3-0.6 mm and the applying of the melting depressant composition may then comprise applying an average of 0.02-1.00 mg phosphorus and silicon per mm$^2$ on the surface of the first metal part. The applying of an average of 0.02-1.00 mg phosphorus and silicon per mm$^2$ on the surface of the first plate includes any indirect application via e.g. the second plate, for example phosphorus and silicon that is transferred from the second plate to the first plate. Thus, the phosphorus and silicon referred to herein must not necessarily have been applied directly on the first metal part, as long as it still contributes to the melting of the surface layer of the first plate.

The first plate may comprise a thickness of 0.6-1.0 mm and the applying of the melting depressant composition may then comprise applying an average of 0.02-1.0 mg phosphorus and silicon per mm$^2$ on the surface of the first plate. As before, the application includes also indirect "application" via the second plate.

The first plate may comprise a thickness of more than 1.0 mm and the applying of the melting depressant composition may then comprise applying an average of 0.02-5.0 mg phosphorus and silicon per mm$^2$ on the surface of the first plate.

The applying of the melting depressant composition may be made before the pressing of the plates. The applying of the melting depressant composition may alternatively be made after the pressing of the plates.

The applying of the melting depressant composition may further be made after stacking the plates into a plate package by flushing a suspension containing the melting depressant composition through the plate package.

The applying of the melting depressant composition may be made by means of screen-printing. or by means of sputtering onto a coil which is cut into plates.

The first surface may have an area that is larger than an area defined by the contact point on said first surface part, such that metal in the melted metal layer flows to the contact point when allowing the joint to form. Such flow is typically caused by capillary action.

The area of the surface may be at least 3 times larger than the area defined by the contact point. The area of the surface may be even larger (or the contact point relatively smaller), such as at least 10, 20 or 30 times larger than the area defined by the contact point. The area of the surface refers to the area of the surface from where melted metal flows to form the joint.

The area of the surface may be at least 3 or at least 10 times larger than a cross-sectional area of the joint. The area of the surface may be even bigger (or the cross-sectional area of the joint relatively smaller), such as it is at least 6 or 10 times larger than the area defined by the contact point. The cross-sectional area of the joint may be defined as the cross-sectional area that the joint has across a plane that is parallel to the surface where the contact point is located, at a location where the joint has its smallest extension (cross sectional area).

The plates may comprise any of:
i) >50 wt % Fe, <13 wt % Cr, <1 wt % Mo, <1 wt % Ni and <3 wt % Mn;
ii) >90 wt % Fe;
iii) >65 wt % Fe and >13 wt % Cr;
iv) >50 wt % Fe, >15.5 wt % Cr and >6 wt % Ni;
v) >50 wt % Fe, >15.5 wt % Cr, 1-10 wt % Mo and >8 wt % Ni;
vi) >97 wt % Ni;
vii) >10 wt % Cr and >60 wt % Ni;
viii) >15 wt % Cr, >10 wt % Mo and >50 wt % Ni;
ix) >70 wt % Co; and
x) >10 wt % Fe, 0.1-30 wt % Mo, 0.1-30 wt % Ni and >50 wt % Co.

The above means that the first plate, and the second plate as well, may be made of a large number of different alloys. Obviously, the examples above are balanced with other metals or elements, as common within the industry.

According to another aspect a plate heat exchanger comprising a plurality of metal heat exchanger plates having a solidus temperature above 1000° C. is provided. The plates are provided beside each other and forming a plate package with first plate interspaces for a first medium and second plate interspaces for a second medium, wherein the first and second plate interspaces are provided in an alternating order in the plate package. Each heat exchanger plate comprises a heat transfer area and an edge area comprising bent edges which extend around the heat transfer area. A first surface of the plates forms a convex shape and a second surface of the plates forms a concave shape and the heat transfer area comprises a corrugation of elevations and depressions. Said corrugation of the plates and the bent edges are provided by pressing the plates. The plate heat exchanger is produced according to the method above or any of its embodiments.

According to another aspect of the invention the plate heat exchanger comprises a first plate that is joined with a second plate by a joint, the plates having a solidus temperature above 1000° C., wherein the joint comprises at least 50 wt % metallic elements that have been drawn from an area (A1) that surrounds the joint and was part of any of the first plate and the second plate is provided.

Different objectives, features, aspects and advantages of the method, the products and the melting depressant composition will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
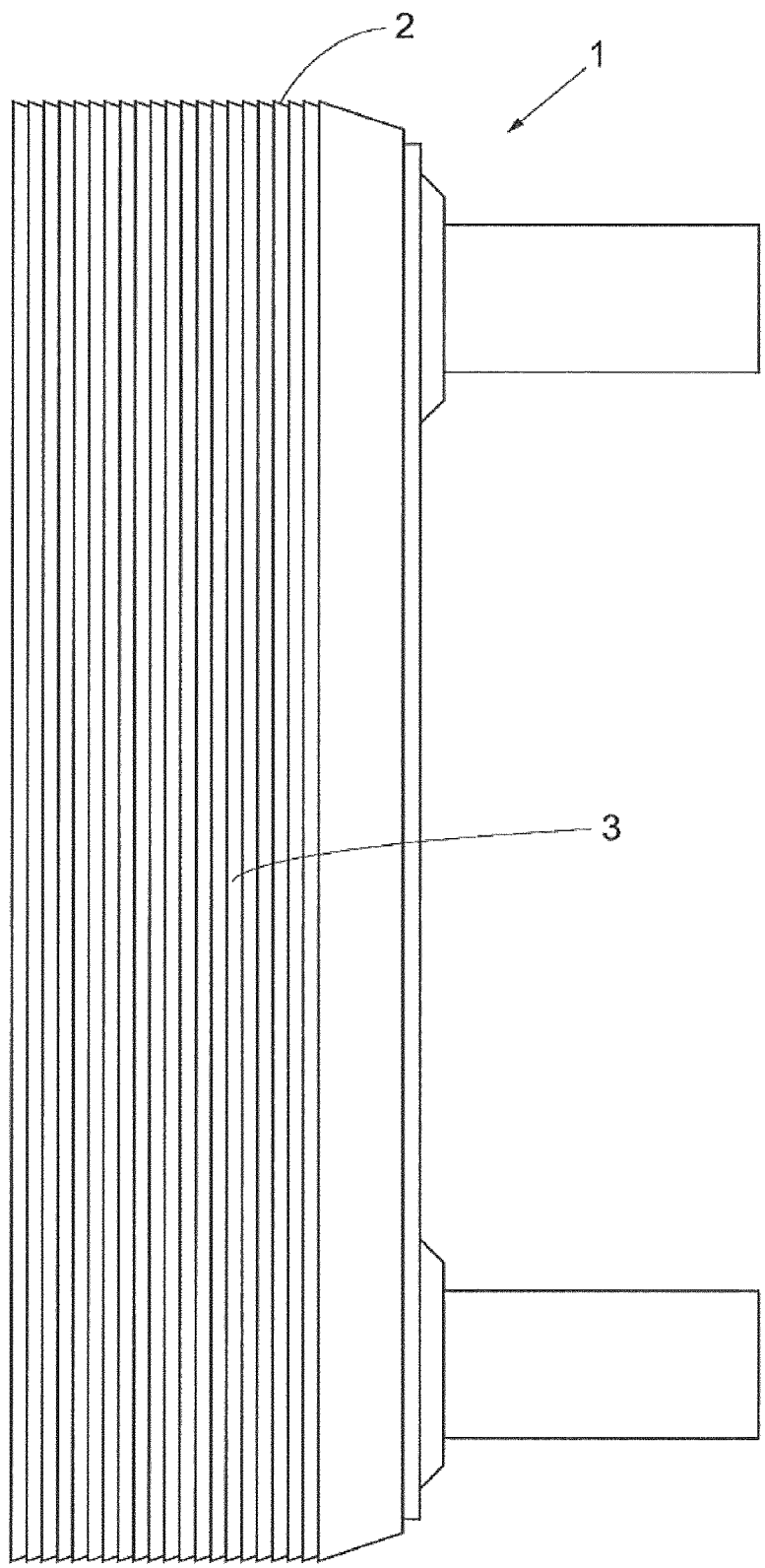
FIG. 1 is a side view of a plate heat exchanger of the prior art.
Figure 3:
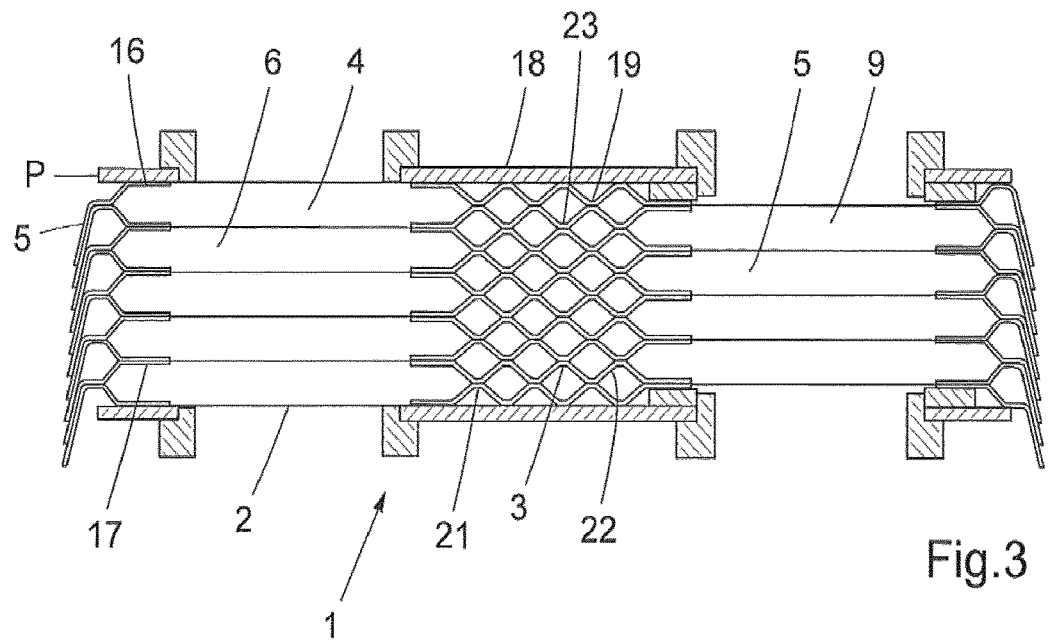
FIG. 3 is a cross-sectional view of a plate heat exchanger according FIG. 1.
Figure 2:
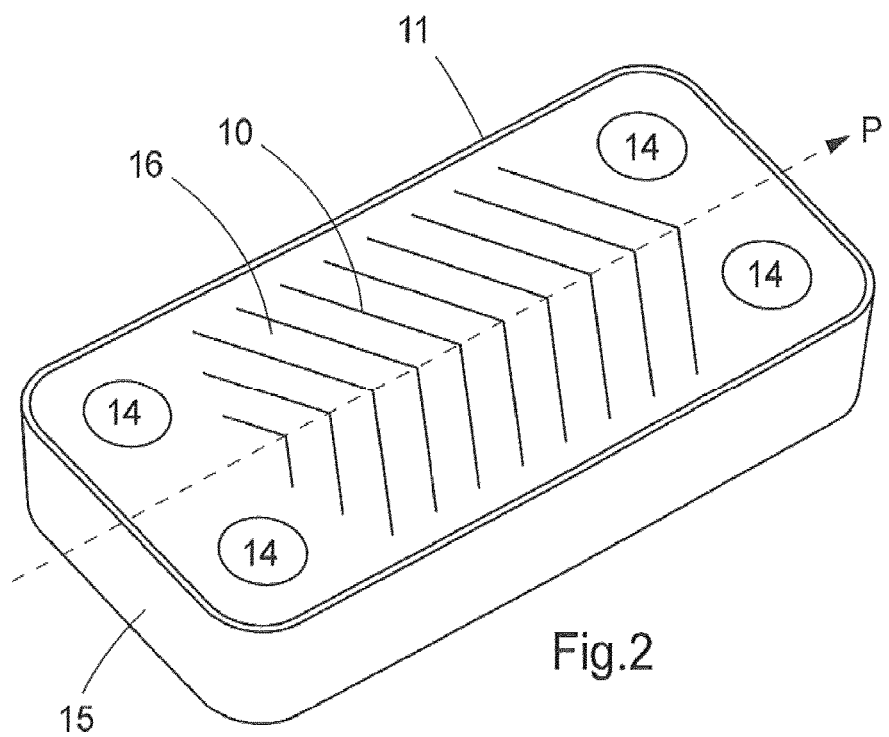
FIG. 2 is a plan view of a plate heat exchanger according to FIG. 1.

With reference to the figures attached, a plate heat exchanger is disclosed, see FIGS. 1, 2 and 3, respectively. The plate heat exchanger 1 comprises a plurality of heat exchanger plates 2 which are provided beside each other for forming a plate package 3 with first plate interspaces 4 for a first medium and second plate interspaces 5 for a second medium. The first plate interspaces 4 and the second plate interspaces 5 are provided in an alternating order in the plate package 3, i.e. every second plate interspace is a first plate interspace 4 and every second a second plate interspace 5, see FIG. 3.

The plate heat exchanger 1 disclosed in FIGS. 1-3 has heat exchanger plates 2 which are permanently joined to each other. The two outermost heat exchanger plates may form or be replaced by end plates.

The plate heat exchanger 1 also comprises inlet and outlet channels 6-9, which are arranged to convey the first medium into the first plate interspaces 4 and out from the same, and to convey the second medium into the second plate interspaces 5 and out from the same. Each heat exchanger plate 2 extends a main extension plane p, and comprises a heat transfer area 10 and an edge area 11 extending around the heat transfer area 10. Each heat exchanger plate 1 also comprises two porthole areas 12 and 13, which are provided at a first end 1A of the heat exchanger plate 1 and at a second end 1B of the heat exchanger plate 1, respectively. The porthole areas 12 and 13 are located inside the edge area 11, and more specifically between the edge area 11 and the heat transfer area 10. Each porthole area 12, 13 comprises at least two portholes 14 which are aligned with respective inlet and outlet channels 6-9. Each heat exchanger plate 1 also comprises a surrounding outer flange or bent edge 15. The bent edge or flange 15 is provided outside or forms an outer part of the edge area 11. It is to be noted that the heat exchanger plates 2 also may have an outer bent edge 15 which extends along a part of the periphery of the heat exchanger plate 1. Accordingly the plates 2 each have a first surface 16 having a convex shape and a second surface 17 having a concave shape.

The heat transfer area 10 comprises a corrugation of elevations 18 and depressions 19. Such depressions and elevations may e g be formed as ridges and grooves or as dimples.

The plates 2 may be made of of eg iron-, nickel and cobalt-based metallic alloys, as they typically have a solidus temperature above 1000° C. The plates may not be made of pure aluminum or aluminum-based alloys that do not have a solidus temperature above 1000° C. For example the plates may typically be made of iron-, nickel- and cobalt-based alloys.

The metal in the plates 2 or even the plates 2 per se may be referred to as the "parent metal" or "parent material". In this context, an "iron-based" alloy is an alloy where iron has the largest weight percentage of all elements in the alloy (wt %). The corresponding situation also applies for e g nickel-, copper-, cobalt-, chromium- and aluminum-based alloys.

Figure 4:
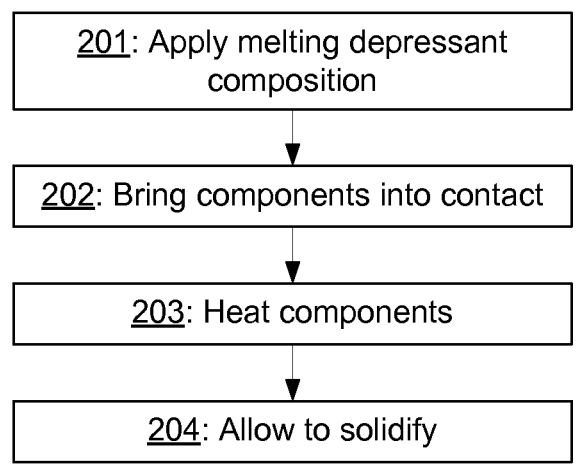
FIG. 4 is a flow chart of a method for joining plates in plate heat exchanger according to the method of the invention.

With reference to FIG. 4 a flow chart of a method for joining plates 2 for a plate heat exchanger 1 is illustrated. The plates 2 may be made of different materials as described above.

In a first step 201 a melting depressant composition 20 is applied on at least a part of the first convex surface 16 of the plates. The melting depressant composition 20 may be applied on only a part of the convex surface 16 or on substantially all of the convex surface 16. In an alternative embodiment the melting depressant composition 20 may also be applied on the second concave surface 17 of the plates 2 but then in an amount which is smaller than the amount of melting depressant composition applied on the first convex surface 16.

The application per se may be done by conventional techniques, e.g. by spraying, screen printing, rolling or painting in case the melting depressant composition comprises a binder component, by PVD or CVD or with only melting point depressants in case not binder component is used.

The melting depressant composition 20 comprises at least one component, which is the melting depressant component. Optionally, the melting depressant composition comprises a binder component. All substances or parts of the melting depressant composition that contributes to decreasing a melting temperature of at least the first metal part is considered to be part of the melting depressant component. Parts of the melting depressant composition that are not involved in decreasing a melting temperature of at least the first metal part but instead "binds" the melting depressant composition, such that it forms e.g. a paste, paint or slurry, is considered to be part of the binder component. Of course, the melting depressant component may include other components, such as small amounts of filler metal. However, such filler metal may not represent more than 75 wt % of the melting depressant component, since at least 25 wt % of the melting depressant component comprises phosphorus and silicon. If a filler metal is included in the melting depressant composition, it is always part of the melting depressant component.

In this context, "phosphorus and silicon" means the sum of phosphorus and silicon in the melting depressant component, as calculated in wt %. Here, wt % means weight percentage which is determined by multiplying mass fraction by 100. As is known, mass fraction of a substance in a component is the ratio of the mass concentration of that substance (density of that substance in the component) to the density of the component. Thus, for example, at least 25 wt % phosphorus and silicon means that the total weight of phosphorus and silicon is at least 25 g. in a sample of 100 g melting depressant component. Obviously, if a binder component is comprised in the melting depressant composition, then the wt % of phosphorus and silicon in the melting depressant composition may be less than 25 wt %. However, at least 25 wt % phosphorus and silicon are always present in the melting depressant component, which, as indicated, also includes any filler metal that may be included, i.e. filler metal is always seen as part of the melting depressant composition.

The "phosphorus" includes all phosphorus in the melting depressant component, which includes elemental phosphorus as well as phosphorus in a phosphorus compound. Correspondingly, the "silicon" includes all silicon in the melting depressant component, which includes elemental silicon as well as silicon in a silicon compound. Thus, both the phosphorus and silicon may, in the melting depressant component, be represented by the phosphorus and silicon in various phosphorus and silicon compounds.

Obviously, the melting depressant composition is very different from conventional brazing substances since they have much more filling metal relative melting depressing substances like phosphorus and silicon. Generally, brazing substances have less than 18 wt % phosphorus and silicon.

The method is advantageous in that filler metal may be reduced or even excluded and in that it may be applied for metal parts that are made of different materials. It may also be used within a wide range of applications, for example for joining heat transfer plates or any suitable metal objects that otherwise are joined by e.g. welding or conventional brazing.

In another embodiment of the invention the melting depressant composition 20 is applied on a coil which subsequently is cut into plates 2.

In a following step 202 the second concave surface 17 of a second plate 22 is brought into contact with the melting depressant composition 20 at contact points 23 on the first convex surface 16 of the first plate 21. By stacking the first and second plates a plate package 3 is created. This can be done manually or automatically by employing conventional, automated manufacturing systems. Of course, the melting depressant composition 20 may be applied on the second concave surface 17 of the second plates 22 as well.

The phosphorus may originate from any of elemental phosphorus and phosphorus of a phosphorus compound selected from at least any of the following compounds: manganese phosphide, iron phosphide and nickel phosphide.

The silicon may originate from any of elemental silicon and silicon of a silicon compound selected from at least any of the following compounds: silicon carbide, silicon boride and ferrosilicon.

The melting depressant component may comprise at least 25 wt %, at least 35 wt % and at least 55 wt % phosphorus and silicon. This means that if any filler metal is present it is present in amounts less than 75 wt %, less than 65 wt % respectively less than 45 wt %.

Phosphorus may constitute at least 10 wt % of the phosphorus and silicon content of the melting depressant compound. This means that, when the melting depressant component comprise at least 25 wt % phosphorus and silicon, then the melting depressant component comprises at least at least 2.5 wt % phosphorus. Silicon may constitute at least 55 wt % of the phosphorus and silicon content of the melting depressant compound.

The melting depressant component may comprise less than 50 wt % metallic elements, or less than 10 wt % metallic elements. Such metallic elements corresponds to the "metal filler" discussed above. Such small amounts of metallic elements or metal filler differentiates the melting depressant composition 20 from e.g. known brazing compositions since they comprise at least 60 wt % metallic elements. Here, "metallic elements" include e.g. all transition metals, which are the elements in the d-block of the periodic table, which includes groups 3 to 12 on the periodic table. This means that, for example, iron (Fe), nickel (Ni), cobalt (Co), chromium (Cr) and molybdenum (Mo) are "metallic elements. Elements that are not "metallic elements" are the noble gases, the halogens and the following elements: boron (B), carbon (C), silicon (Si), nitrogen (N), phosphorus (P), arsenic (As), oxygen (O), sulfur (S), selenium (Se) and tellurium (Tu). It should be noted that, for example, if the phosphorus comes from the compound manganese phosphide, then the manganese-part of this compound is a metallic element that is included in the metallic elements that in one embodiment should be less than 50 wt % and in the other embodiment less than 10 wt %.

The plates 2 may have a thickness of 0.3-0.6 mm and the applying 201 of the melting depressant composition 20 may then comprise applying an average of 0.02-1.00 mg phosphorus and silicon per $mm^2$ on the first convex surface 16 of the first plate 21. The applying of an average of 0.02-1.00 mg phosphorus and silicon per $mm^2$ on the surface of the first convex surface 16 includes any indirect application via e.g. the second concave surface 17, for example phosphorus and silicon that is transferred from the second plate 22 to the first plate 21. Thus, the phosphorus and silicon referred to herein must not necessarily have been applied directly on the first plate 21, as long as it still contributes to the melting of the surface layer of the first convex surface 16 of the first plate 21.

The plates 2 may have a thickness of 0.6-1.0 mm and the applying of the melting depressant composition 20 may then comprise applying an average of 0.02-1.0 mg phosphorus and silicon per $mm^2$ on the surface of the plates 2.

The plates 2 may have a thickness of more than 1.0 mm and the applying of the melting depressant composition may then comprise applying an average of 0.02-5.0 mg phosphorus and silicon per $mm^2$ on the surface of the plates 2.

The melting depressant composition may be applied on a surface having an area that is larger than an area defined by the contact points 23, such that metal in the melted metal layer flows to the contact point when allowing the joint to form. Such flow is typically caused by capillary action.

The area of the melting component surface may be at least 3 times larger than the area defined by the contact points 23. The area of the surface may be even larger (or the contact point relatively smaller), such as at least 10, 20 or 30 times larger than the area defined by the contact point. The area of the surface refers to the area of the surface from where melted metal flows to form the joint. Of course the melting depressant composition may be applied on all of the first convex surface 16 of the first plate 21.

The area of the surface may be at least 3 or at least 10 times larger than a cross-sectional area of the joint. The area of the surface may be even bigger (or the cross-sectional area of the joint relatively smaller), such as it is at least 6 or 10 times larger than the area defined by the contact point. The cross-sectional area of the joint may be defined as the cross-sectional area that the joint has across a plane that is parallel to the surface where the contact point is located, at a location where the joint has its smallest extension (cross sectional area).

The first plates 2 may comprise any of:
i) >50 wt % Fe, <13 wt % Cr, <1 wt % Mo, <1 wt % Ni and <3 wt % Mn;
ii) >90 wt % Fe;
iii) >65 wt % Fe and >13 wt % Cr;
iv) >50 wt % Fe, >15.5 wt % Cr and >6 wt % Ni;
v) >50 wt % Fe, >15.5 wt % Cr, 1-10 wt % Mo and >8 wt % Ni;
vi) >97 wt % Ni;
vii) >10 wt % Cr and >60 wt % Ni;
viii) >15 wt % Cr, >10 wt % Mo and >50 wt % Ni;
ix) >70 wt % Co; and
x) >10 wt % Fe, 0.1-30 wt % Mo, 0.1-30 wt % Ni and >50 wt % Co.

The above means that the plates 2 may be made of a large number of different alloys. Obviously, the examples above are balanced with other metals or elements, as common within the industry.

In a next step 203 the plate package 3 is heated to a temperature which is above 1000° C. The exact temperature can be found in the following examples. During the heating the first convex surface 16 of the first plate 21 melt and forms a surface layer 24 and, together with the melting depressant component, forms a melted metal layer 25 that is in contact with the second concave surface 17 of the second plate 22 at the contact points 23 between the first plate 21 and the second plate 22. When this happen, metal of the melted metal layer flows towards the contact point 23.

In a final step 204 the melted metal layer 25 is allowed to solidify, such that a joint 26 is obtained at the contact points 23 between the plates in the plate package 3 and such that the bent edges 15 form a tight fit between the bent edges 15 of the plates 2 in the plate package 3. i.e. the metal that has flown to the contact points 23 solidifies. By applying 201 the melting depressant composition 20 on only the convex surface 16 of the plates 2 it was surprisingly found that a change in shape of the plates 2 occur such that the convex shape of the plates 2 becomes even more convex, ie the bent edges 15 create a very tight and snug fit to each other in the plate package 3, which becomes more tight than is the case in known brazing techniques Actually, also more tight than the original distance was between the bent edges 15. In comparison, if applying the melting depressant composition 20 only on the concave surface 17 the gap increases between the bent edges 15. The change in shape occurs when the blends alloys with the surface, also meaning that there will be a compressive stress in the surface due to the alloying. If both the melting depressant composition is applied on both the convex surface 16 and the concave surface 17 there will be compressive stresses present in both surfaces, resulting in an increase of the fatigue strength of the plates 2 and the plate package 3.

The solidification typically includes decreasing temperature to normal room temperature. However, solidification also occurs during the physical process of redistribution of components (phosphorus and silicon) in the joint area, before a temperature is decreased.

Depending on the shape of the metal parts to be joined the area on which the melting depressant composition is applied may be substantially equal to the area of a joint that is subsequently formed.

From the description above follows that, although various embodiments of the invention have been described and shown, the invention is not restricted thereto, but may also be embodied in other ways within the scope of the subject-matter defined in the following claims. Various melting depressant compositions can also be combined with various metals for the metal parts. For example, melting depressant composition (blend) A3.3 may be combined with metal parts made of 316 steel.

EXAMPLES

A number of experiments and examples are now presented for describing suitable materials for the plates, the composition of the melting depressant composition 23, which amounts of melting depressant composition should be used, suitable temperatures for the heating, for how long heating shall be done etc. Thus, the results of these experiments and examples are used for previously described entities like the first plate, the second plate, the melting depressant composition, the contact point, the joint etc., i.e. all previously described entities may incorporate the respectively related features described in connection with the experiments and examples below. In the following the melting depressant composition is referred to as a "blend". Metal plate may be referred to as "parent metal".

A number of suitable melting depressant compositions, i.e. melting point temperature depressant compositions, have been tested. The active component in the melting depressant composition is phosphorous (P). Compounds of phosphorous have been selected as the source for phosphorous. The compounds include $Fe_3P$, NiP and $Mn_3P_2$, where $Mn_3P_2$ is a mixture of MnP and $Mn_2P$. Other compounds that include phosphorous may be used just as well—they only have to be verified in respect of their usefulness and in respect of the result they provide, in a similar manner as done for the for $Fe_3P$, NiP and $Mn_3P_2$ and outlined below.

The $Fe_3P$, also called iron phosphide, is a conventional compound that was obtained from the company Alfa Aesar, with a CAS (Chemical Abstracts Service) number of 12023-53-9 and MDL (Molecular Design Limited) number of MFCD00799762.

The $Mn_3P_2$, also called manganese phosphide, is a conventional compound that was obtained from the company Alfa Aesar, with a CAS (Chemical Abstracts Service) number of 12263-33-1 and MDL (Molecular Design Limited) number of MFCD00064736.

The NiP, also called nickel phosphorus, is a conventional compound that was plated on a metal part to be joined. The metal part to be joined is also referred to as a base metal or base material, The plating was done by performing a conventional nickel phosphorus plating method, as done by, for example, the company Brink Förnicklingsfabriken AB in Norrköping, Sweden For some the of the examples Si, or Silicon, was used. The silicon is a conventional compound that was obtained from the company Alfa Aesar, is referred to as "silicon powder, crystalline, −325 mesh, 99.5% (metals basis)", with CAS 7440-21-3 and MDL MFCD00085311.

When looking on the atomic compositions of compounds, by applying the atomic weights and by using conventional calculation techniques it may be determined that $Fe_3P$ comprises 16 wt % P (phosphorous) and $Mn_3P_2$ comprises 27 wt % P. When nickel plating, approximately 11-14 wt % P are comprised in the NiP layer.

A binder was used for applying the $Fe_3P$ and the $Mn_3P_2$ on metal parts to be joined. The binder (polymeric and solvent) is a binder sold by Wall Colmonoy under the name of Nicorobraz S-20 (S-20). A sample of the binder was placed on a metal plate and dried at 22° C. for 24 h. The weight of the sample was 0.56 g before drying and 0.02 g after drying. Thus, 3.57 wt % of the binder are components that remain after drying. A melting depressant composition was prepared where $Mn_3P_2$ and Si form a melting depressant component (melting point temperature depressant component) and where were the binder S-20 form a binder component. The preparation was done by first mixing $Mn_3P_2$ with Si and then by adding and mixing the binder S-20. Two variants of the melting depressant composition with different amounts of Si was prepared, referred to as A1 $Mn_3P_2$ (A1) and B1 $Mn_3P_2$ (B1), as shown in table 1.

TABLE 1

| X: | A1 $Mn_3P_2$ | B1 $Mn_3P_2$ |
|---|---|---|
| X: | 10.00 g | 10.00 g |
| Si | 4.07 g | 6.15 g |
| Sum X and Si | 14.07 g | 16.15 g |
| X:Si | 2.46:1 | 1.63:1 |
| S-20 | 16.80 g | 15.98 g |
| Tot sum | 30.87 g | 32.13 g |

Figure 5:
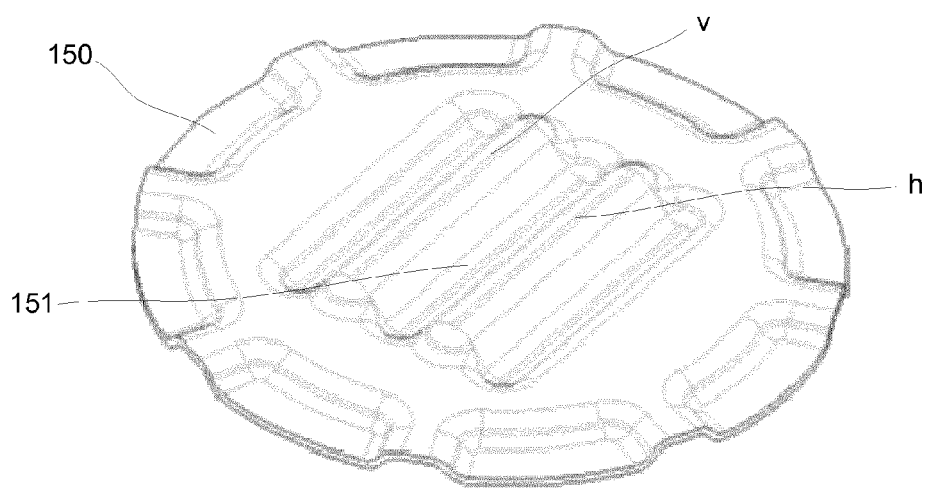
FIG. 5 shows a pressed plate that is used in a number of examples that described how two metal parts may be joined.

In FIG. 5 the compositions A1 and A2 were applied on flat, circular test pieces of stainless steel type 316 L (SAE steel grade) and with a diameter of 42 mm in diameter.

On every test piece another piece of a different material, 254 SMO (SAE steel grade), was placed. This other piece is shown in FIG. 5 and has the form of a circular, pressed plate 150, which is 42 mm in diameter and has a thickness of 0.4 mm The pressed plate 150 has two pressed beams v and h, each approximately 20 mm long. When the piece with the beams was placed on the flat piece, contact points were formed where the beams of piece 150 abut the other, flat piece.

The pieces, i.e. that flat circular piece and the pressed plate, are referred to as a sample, and several samples were heat treated for 2 hours in vacuum at different temperatures for each sample. Table 2 shows which amounts of the compositions that were used for the samples.

For samples A1:1 to A1:3 and samples B1:1 to B1:3 the heat treatment comprised holding the samples in a temperature of 1120° C. for 2 hours at vacuum.

For samples A1:4 to A1:6 and samples B1:4 to B1:6 the heat treatment comprised holding the samples in a temperature of 1140° C. for 2 hours at vacuum.

A1 indicates composition A1 $Mn_3P_2$ while B2 indicates composition B1 $Mn_3P_2$. The numbers after A1 respectively B2 indicates different samples, as presented in Table 2. In this table is the weight of the sample is presented, which includes the weight of the melting depressant component and the weight of the dry binder component.

TABLE 2

| Sample | Dry binder + melting depressant component (g) |
|---|---|
| A1:1 | 0.22 |
| A1:2 | 0.13 |
| A1:3 | 0.14 |
| A1:4 | 0.33 |
| A1:5 | 0.1 |
| A1:6 | 0.16 |
| B1:1 | 0.19 |
| B1:2 | 0.09 |
| B1:3 | 0.16 |
| B1:4 | 0.16 |
| B1:5 | 0.34 |
| B1:6 | 0.14 |

Figure 6:
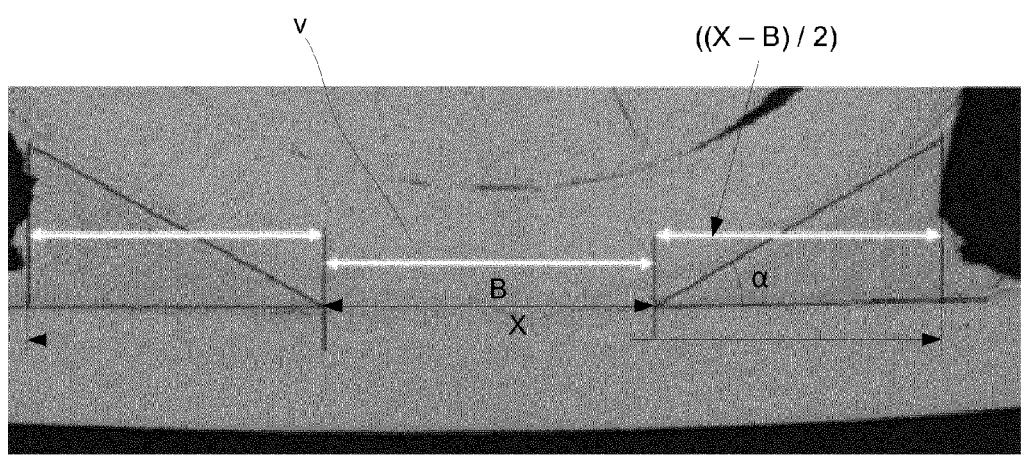
FIG. 6 is a photo of a cross-section of a joint between the plate shown in FIG. 5 and a flat plate.
Figure 7:
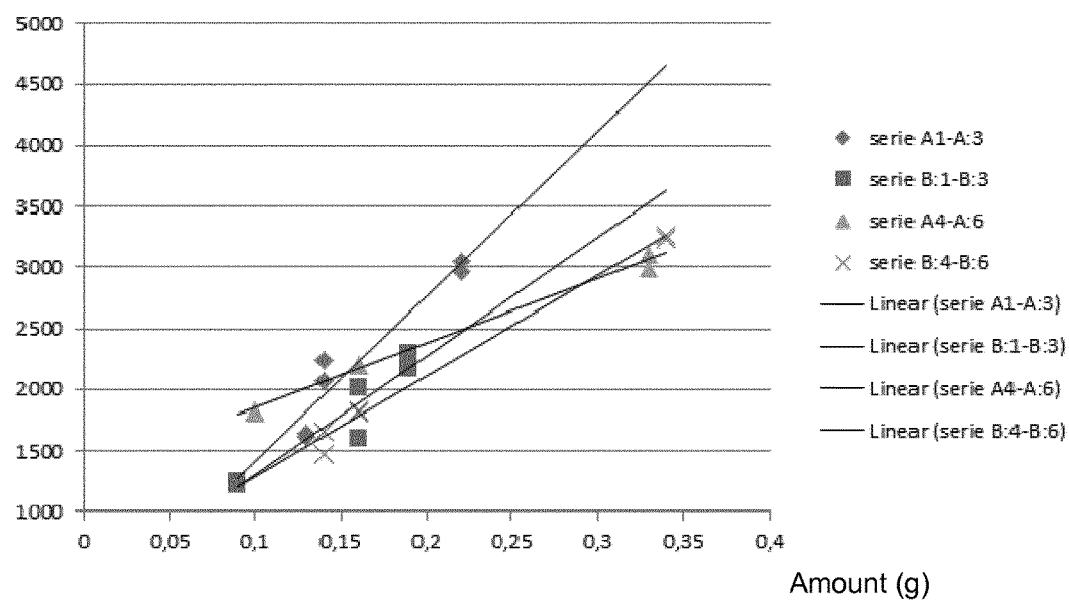
FIG. 7 shows a diagram where a measured joint width is plotted as a function of an applied amount of melting depressant composition, including trend lines.

After the heat treatment the samples were allowed to cool to a room temperature (22° C.) and it was observed that the two pieces of the sample were joined along the lengths of the beams of the pressed plate 150, i.e. the sample has joints along the beams. The samples were cut across the joints at two sections and each joint was measured at its broadest section X, which is illustrated in FIG. 6. The results are presented in Table 3 and illustrated in the diagram of FIG. 7, where the width of the joint is plotted as a function of the applied amount of melting depressant composition.

TABLE 3

| Sample | applied amount (g) | width (μm) |
|---|---|---|
| A1-2 | 0.13 | 1640 |
| A1-2 | 0.13 | 1610 |
| A1-3 | 0.14 | 2070 |
| A1-3 | 0.14 | 2240 |
| A1-1 | 0.22 | 2961 |
| A1-1 | 0.22 | 3050 |
| B1-2 | 0.09 | 1240 |
| B1-2 | 0.09 | 1220 |
| B1-3 | 0.16 | 2010 |
| B1-3 | 0.16 | 1600 |
| B1-1 | 0.19 | 2170 |
| B1-1 | 0.19 | 2290 |
| A1-5 | 0.1 | 1831.9 |
| A1-5 | 0.1 | 1810.1 |
| A1-6 | 0.16 | 2195.01 |
| A1-6 | 0.16 | 2202.28 |
| A1-4 | 0.33 | 3107.63 |
| A1-4 | 0.33 | 2993.13 |
| B1-6 | 0.14 | 1470.32 |
| B1-6 | 0.14 | 1661.94 |
| B1-4 | 0.16 | 1832.65 |
| B1-4 | 0.16 | 1810.9 |
| B1-5 | 0.34 | 3264.29 |
| B1-5 | 0.34 | 3237.96 |

Figure 8:
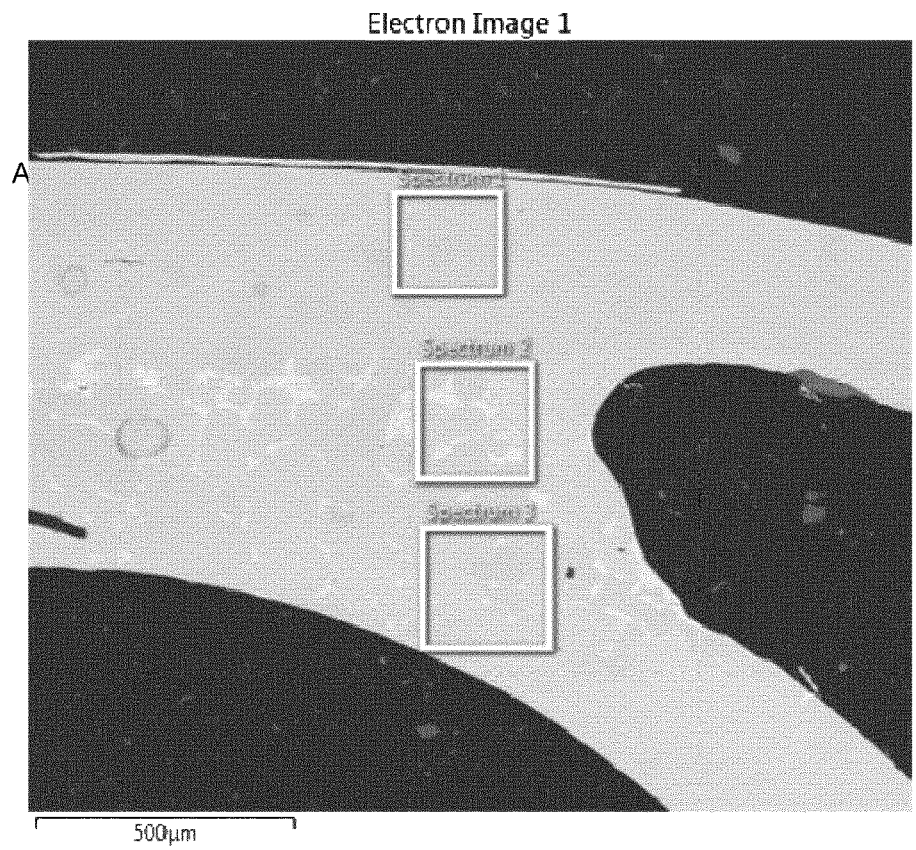
FIGS. 8-12 show a cross section of a joint investigated in an SEM, (scanning electron microscope), and locations of electron scanning.

Metallurgical investigations were then made for the joints. This was done by analyzing the cut cross sections of the joints in a so called SEM-EDX, which is a conventional and commercially available scanning electron microscope with X-ray detector. FIG. 8 illustrates the locations of three measurements for sample A1-6 and Table 4 shows the results of the measurements.

TABLE 4

| Spectrum Label (chemical substance) | Spectrum 1 | Spectrum 2 | Spectrum 3 |
|---|---|---|---|
| C | 3.04 | 2.86 | 2.95 |
| Si | 0.40 | 2.40 | 1.52 |
| P | — | 1.43 | 0.76 |
| Cr | 16.11 | 18.00 | 17.33 |
| Mn | 1.50 | 1.63 | 1.35 |
| Fe | 62.90 | 50.54 | 51.15 |
| Ni | 13.88 | 18.00 | 20.76 |
| Mo | 2.17 | 5.16 | 4.17 |
| Total | 100.00 | 100.00 | 100.00 |

The investigations shows that the joints comprise at least 90 wt % metal that, before the heating, was part of any of the first metal part and the second metal part, i.e. the pieces of the sample. This is readily determined since Mn and P together represent less than 2.2 wt %.

Figure 9:
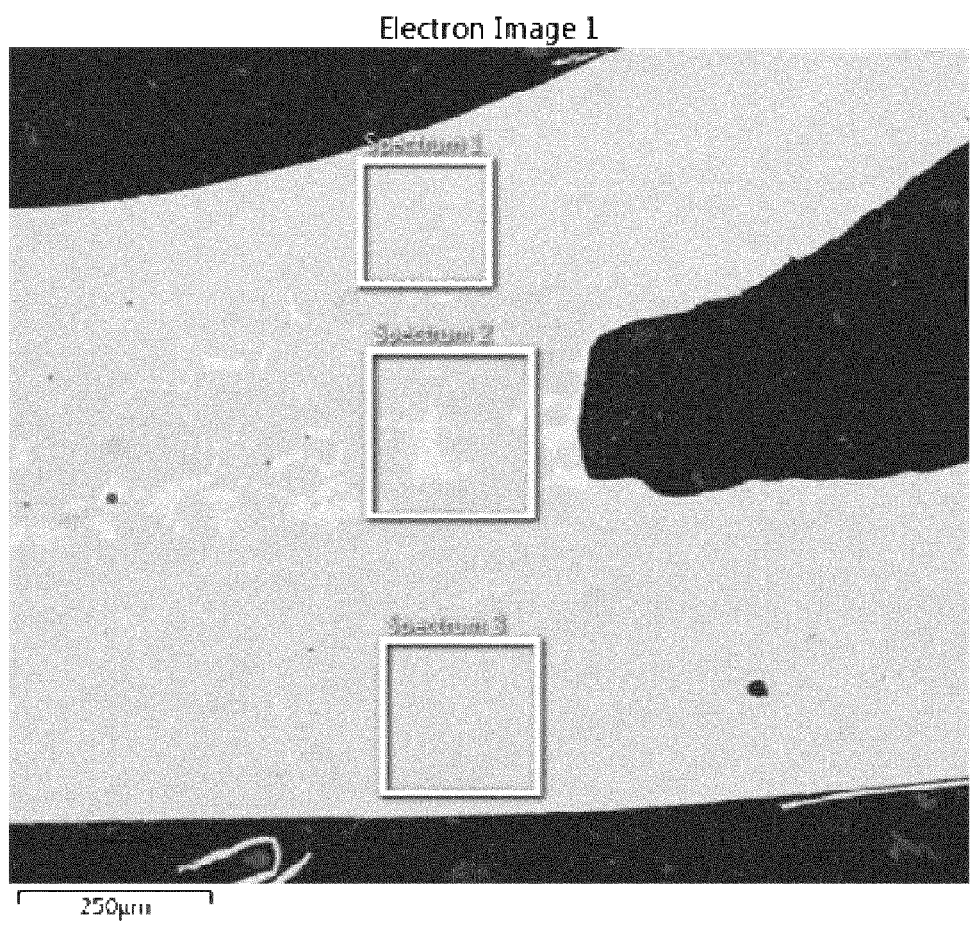

Similar investigations were also made for sample B1-6. FIG. 9 illustrates the locations of three measurements for sample B1-6 and Table 5 shows the results of the measurements.

TABLE 5

| Spectrum Label (chemical substance) | Spectrum 1 | Spectrum 2 | Spectrum 3 |
|---|---|---|---|
| C | 2.87 | 2.86 | 2.77 |
| Si | 0.43 | 2.58 | 0.42 |
| P | 0.17 | 1.76 | |
| Cr | 18.75 | 16.72 | 16.61 |
| Mn | 0.00 | 2.41 | 1.46 |
| Fe | 50.56 | 50.18 | 63.19 |
| Ni | 21.70 | 18.90 | 13.63 |
| Mo | 5.53 | 4.58 | 1.91 |
| Total | 100.00 | 100.00 | 100.00 |

Investigations shows that the joints comprises at least 90 wt % metal that, before the heating, was part of any of the first metal part and the second metal part, i.e. the pieces of the sample. This is readily determined since Mn and P together represent less than 4.2 wt %, In a next test pieces of type 316 stainless steel, referred to as 316, with a diameter of 42 mm were applied with three different melting depressant compositions (one composition on a respective piece): i) $Mn_3P_2$, ii) NiP plated on 316 and iii) NiP plated on 316 together with Si as melting point depressants. The thickness of the plated NiP is 50 μm. 0.15 g Si was applied by conventional painting. On every piece a pressed piece similar to that of FIG. 5 of type 254 SMO was placed. The pieces form samples that were heat treated for 2 hours in vacuum at 1120° C. Joints were formed between the pieces.

Figure 10:
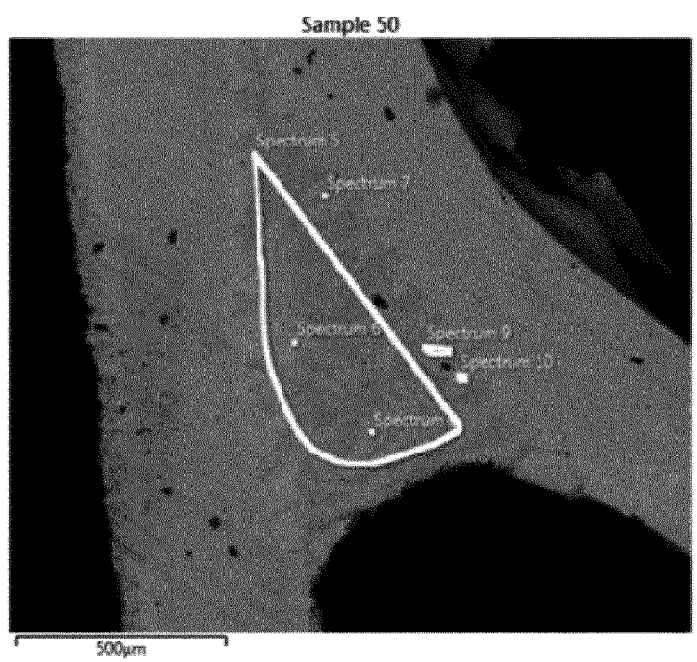

Table 6 shows an analysis of a cut cross section of the joints by using SEM-EDX for the sample with 50 μm NiP plating. From the result it appears that the joint comprises at least 20 wt % metal that, before the heating, was part of any of the piece (first metal part) or second piece (second metal part). FIG. 10 shows the location of the measurements in the joint.

TABLE 6

| Spectrum Label (chemical substance) | Spectrum 10 | Spectrum 5 | Spectrum 6 | Spectrum 7 | Spectrum 8 | Spectrum 9 |
|---|---|---|---|---|---|---|
| O | 0.91 | 1.48 | 0.67 | 1.20 | 0.99 | 2.34 |
| Si | 0.32 | 0.26 | 0.29 | — | 0.18 | — |
| P | 1.07 | 9.60 | 0.95 | 14.41 | 1.06 | 10.84 |
| Cr | 7.42 | 8.83 | 7.64 | 17.99 | 7.78 | 13.27 |
| Mn | — | 0.61 | — | 0.51 | — | 0.43 |
| Fe | 33.22 | 23.11 | 33.69 | 20.17 | 33.60 | 23.03 |
| Ni | 56.01 | 54.25 | 55.61 | 40.95 | 55.06 | 46.83 |
| Mo | 1.06 | 1.86 | 1.16 | 4.77 | 1.33 | 3.25 |
| Total | 100.00 | 100.00 | 100.00 | 100.00 | 100.00 | 100.00 |

Figure 11:
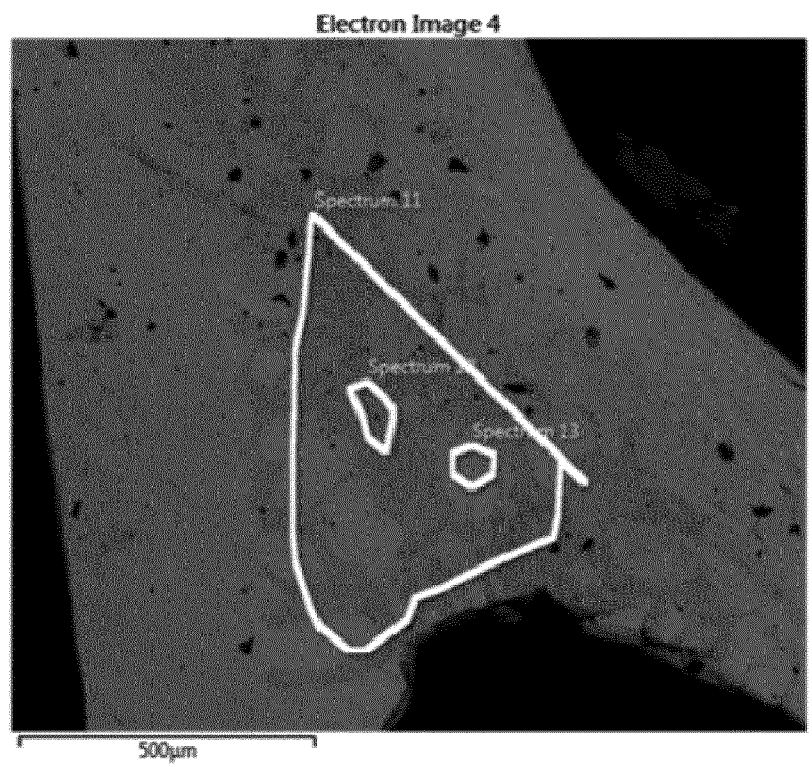

Table 7 shows an analyze of a cut cross section of the joints by using SEM-EDX for the sample with 50 μm NiP plating where app 0.15 g amount of Si has been applied (painted) on the plated surface. From the result it appears that the joint comprises more metal in comparison with the test where no Si was used. A higher amount of Si would most likely increase the amount of metal in the joint that comes from the test pieces. FIG. 11 shows the location of the measurements in the joint.

TABLE 7

| Spectrum Label (chemical substance) | Spectrum 11 | Spectrum 12 | Spectrum 13 |
|---|---|---|---|
| C | 7.44 | 6.41 | 6.34 |
| O | 1.48 | 1.71 | 1.06 |
| Si | 2.22 | 1.99 | 2.43 |
| P | 5.76 | 8.83 | 0.48 |
| Cr | 11.13 | 12.33 | 9.47 |
| Mn | 0.39 | 0.51 | 0.00 |
| Fe | 30.33 | 26.57 | 38.80 |
| Ni | 38.70 | 38.19 | 40.10 |
| Mo | 2.54 | 3.46 | 1.33 |
| Total | 100.00 | 100.00 | 100.00 |

Figure 12:
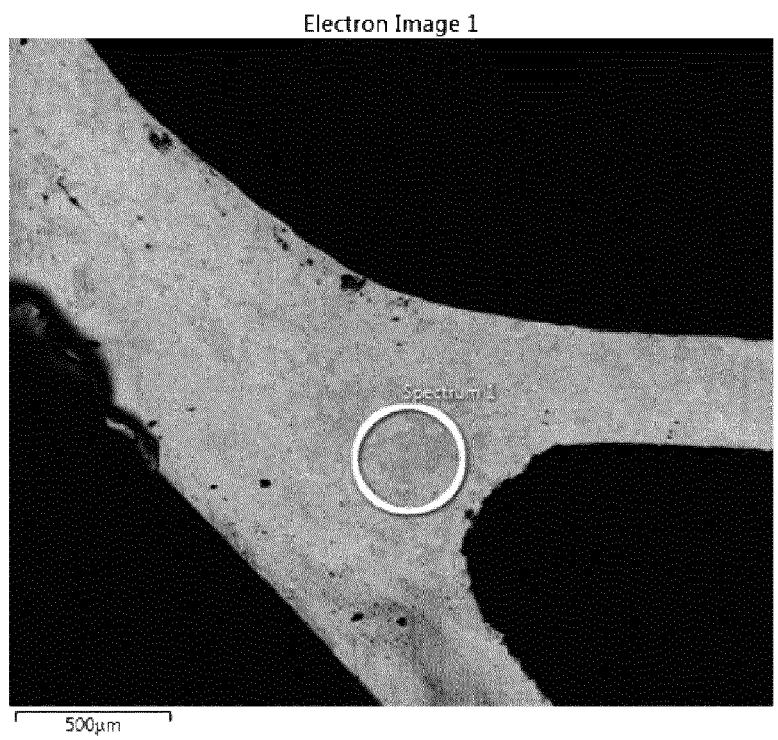

Table 8 shows an analysis of a cut cross section of the joints by using SEM-EDX for the sample with $Mn_3P_2$. The $Mn_3P_2$ has been mixed 50 wt:50 wt with S-20 binder but no Si is used. An amount of 0.2 g (after drying of the binder component) was applied. From the result it appears that the joint comprises at least 80 wt % metal that before the joining was part of the products that were joined. FIG. 12 shows the location of the spectrum 1 measurements in the joint.

TABLE 8

| Spectrum Label (chemical substance) | Spectrum 1 | Spectrum 2 |
|---|---|---|
| O | — | 2.28 |
| Si | 0.29 | 0.31 |
| P | 6.33 | 7.23 |
| S | — | 0.54 |
| Cr | 21.70 | 22.65 |
| Mn | 1.08 | 1.40 |
| Fe | 51.93 | 46.63 |
| Ni | 12.02 | 12.19 |
| Mo | 6.65 | 6.78 |
| Total | 100.00 | 100.00 |

The invention claimed is:

1. A method for producing a permanently joined plate heat exchanger comprising a plurality of metal heat exchanger plates having a solidus temperature above 1000° C., provided beside each other and forming a plate package with first plate interspaces for a first medium and second plate interspaces for a second medium, wherein the first and second plate interspaces are provided in an alternating order in the plate package,
    wherein each heat exchanger plate comprises a heat transfer area and an edge area comprising bent edges which extend around the heat transfer area,
    wherein a first surface of each of the metal heat exchanger plates forms a convex shape and a second surface of each of the metal heat exchanger plates forms a concave shape wherein the heat transfer area comprises a corrugation of elevations and depressions,
    wherein said corrugation of the metal heat exchanger plates and the bent edges are provided by pressing the metal heat exchanger plates,
    the method comprising:
    applying a melting depressant composition on at least a part of the first surface of a first plate of said plurality of metal heat exchanger plates, the melting depressant composition comprising:
    a melting depressant component that comprises phosphorus and silicon for decreasing a melting temperature of the first plate and metallic elements, wherein the melting depressant component comprises less than 50 wt % metallic elements, and
    a binder component for facilitating the applying of the melting depressant composition on the first convex shape of the first surface,
    bringing a second concave surface of a second plate of said plurality of metal heat exchanger plates into contact with the melting depressant composition on said first surface of the first plate by stacking the first and second plates into the plate package,
    heating the first and second plates to a temperature above 1000° C., said first surface of the first plate thereby melting such that a surface layer of the first plate melts and, together with the melting depressant component, forms a molten metal layer that is in contact with the second plate at contact points between the first plate and the second plate, and
    allowing the molten metal layer to solidify, and form a joint at the contact points between the first and second plates in the plate package and such that the bent edges form a tight fit between the bent edges of the first and second plates in the plate package, the joint comprising at least 50 wt % metal that, before the heating was part of any of the first plate and the second plate.

2. The method according to claim 1, wherein the phosphorus originates from a phosphorus compound selected from at least any of the following compounds: MnxPy, FePy and NixPy.

3. The method according to claim 1, wherein the silicon originates from any of elemental silicon and silicon of a silicon compound selected from any of the following compounds: silicon carbide, silicon boride and ferrosilicon.

4. The method according to claim 1, wherein the melting depressant component comprises any of at-least 25 wt %, at least 35-wt % and at least 55 wt % phosphorus and silicon.

5. The method according to claim 1, wherein phosphorus constitutes at least 10 wt % of the phosphorus and silicon content of the melting depressant compound component.

6. The method according to claim 1, wherein phosphorus constitutes at least 55 wt % of the phosphorus and silicon content of the melting depressant-compound component.

7. The method according to claim 1, wherein the melting depressant component comprises less than 10 wt % metallic elements.

8. The method according to claim 1, wherein the first plate has a thickness of 0.3-0.6 mm and the applying of the melting depressant composition comprises applying an average of 0.02-1.00 mg phosphorus and silicon per mm2 on the first convex surface of the first plate.

9. The method according to claim 1, wherein the first metal part comprises a thickness of 0.6-1.0 mm and the applying of the melting depressant composition comprises applying an average of 0.02-2.0 mg phosphorus and silicon per mm2 on the first convex surface of the first plate.

10. The method according to claim 1, wherein the applying of the melting depressant composition comprises heating the first and second plates until the melting depressant composition binds to the first convex-surface of the first plate, and decreasing the temperature of the first and second plates, before all phosphorus and silicon in the melting depressant composition have formed a compound with the metal in the first plate.

11. The method according to claim 1, wherein the applying of the melting depressant composition is made before the pressing of the first and second plates.

12. The method according to claim 1, wherein the applying of the melting depressant composition is made after the pressing of the first and second plates.

13. The method according to claim 1, wherein the applying of the melting depressant composition is made after stacking the first and second plates into the plate package by flushing a suspension containing the melting depressant composition through the plate package.

14. The method according to claim 1, wherein the applying of the melting depressant composition is made by means of screen-printing.

15. The method according to claim 1, wherein the applying of the melting depressant composition is made by means of sputtering onto a coil which is cut into the first and second plates.

16. The method according to claim 1, wherein the first surface has an area that is larger than an area defined by the contact points on said surface, such that metal in the melted metal layer flows to the contact point when allowing the joint to form.

17. The method according to claim 16, wherein the area of the convex surface is at least 3 times larger than the area defined by the contact point.

18. The method according to claim 16, wherein the area of the surface is at least 10 times larger than a cross-sectional area of the joint.

19. The method according to claim 1, wherein the heat exchanger plates comprise one of (a) >50 wt % Fe, <13 wt % Cr, <1 wt % Mo, <1 wt % Ni and <3 wt % Mn, (b) >90 wt % Fe, (c) >65 wt % Fe and >13 wt % Cr, (d) >50 wt % Fe, >15.5 wt % Cr and >6 wt % Ni, (e) >50 wt % Fe, >15.5 wt % Cr, 1-10 wt % Mo and >8 wt % Ni, (f) >97 wt % Ni, (g) >10 wt % Cr and >60 wt % Ni, (h) >15 wt % Cr, >10 wt % Mo and >50 wt % Ni, (i) >70 wt % Co, (j) >80% Cu, or (k) >10 wt % Fe, 0.1-30 wt % Mo, 0.1-30 wt % Ni and >50 wt % Co.

20. A permanently joined plate heat exchanger comprising a plurality of metal heat exchanger plates having a solidus temperature above 1000° C., provided beside each other and forming a plate package with first plate interspaces for a first medium and second plate interspaces for a second medium, wherein the first and second plate interspaces are provided in an alternating order in the plate package,
wherein each heat exchanger plate comprises a heat transfer area and an edge area comprising bent edges which extend around the heat transfer area,
wherein a first surface of the heat exchanger plates forms a convex shape and a second surface of the heat exchanger plates forms a concave shape wherein the heat transfer area comprises a corrugation of elevations and depressions,
wherein a first plate of said plurality of metal heat exchanger plates comprises a melting depressant composition on at least a part of a first surface of the first plate, the melting depressant composition comprising:
a melting depressant component that comprises phosphorus and silicon for decreasing a melting temperature of the first plate and metallic elements, wherein the melting depressant component comprises less than 50 wt % metallic elements, and
a binder component for facilitating the applying of the melting depressant composition on the convex shape of the first surface,
wherein a second plate of said plurality of metal heat exchanger plates comprises a second concave surface,
wherein the plate package comprises: the first and second plates stacked with the concave surface of the second plate in contact with the melting depressant composition on said first surface of the first plate,
wherein joints are formed at contact points between the first and second plates such that the bent edges form a tight fit between the bent edges of the first and second plates in the plate package,
the joints comprising: a solidified molten metal layer comprising at least 50 wt % metal that was part of any of the first plate and the second plate before the first and second plates were heated to a temperature above 1000° C. to melt a surface layer of the first plate with the melting depressant component to form the molten metal layer at contact points between the first and second plates.

21. The plate heat exchanger according to claim 20 wherein the joint comprises at least 50 wt % metallic elements that have been drawn from an area that surrounds the joint and was part of any of the first plate and the second plate.

* * * * *